United States Patent Office 2,708,343
Patented May 17, 1955

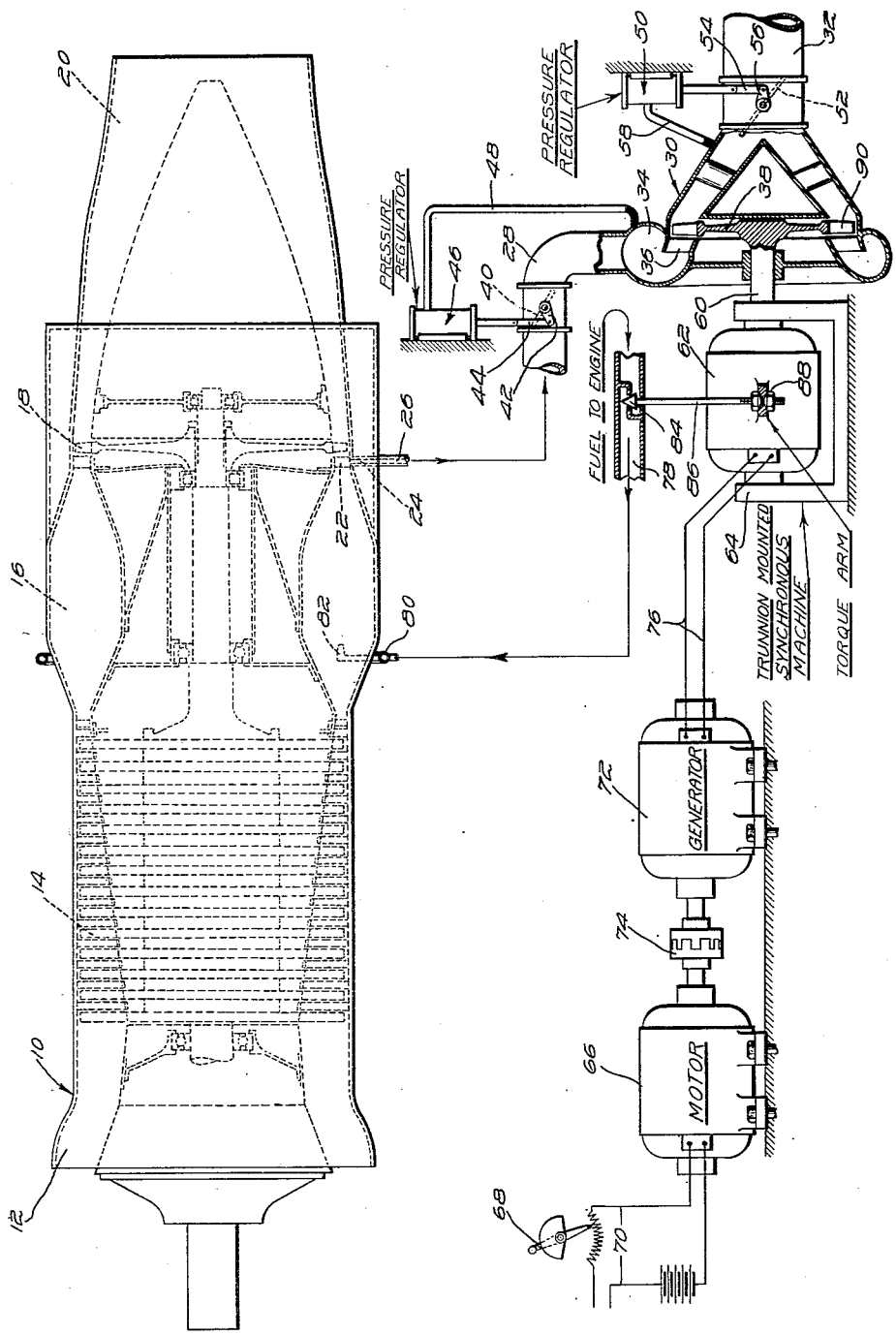

2,708,343

TEMPERATURE CONTROL SYSTEM FOR GAS TURBINE POWER PLANTS

Bertrand H. Brown, Glastonbury, and Edward F. Esmeier, Warehouse Point, Conn., assignors to United Aircraft Corporation, East Hartford, Conn., a corporation of Delaware Application August 16, 1951, Serial No. 242,092

19 Claims. (Cl. 60—39.28)

This invention relates to fuel controls for combustion engines, more particularly to a fuel control system for a combustion engine which uses the torque reaction on a small exhaust turbine, induced by the temperature of engine exhaust gases flowing thereover, to regulate fuel flow to the engine.

In the operation of gas turbine power plants fuel flow to the power plant usually is metered as a function of the temperature of the turbine gases, turbine inlet temperature being a parameter often used. An accurate and reliable measure of exhaust gas temperature thus is of utmost importance. Thermocouples customarily employed to measure this gas temperature are not reliable and are short-lived because of the pernicious effect of the elevated temperatures to which they are subjected.

It is known that when a constant pressure ratio is maintained across a turbine and the speed of the turbine is also maintained constant, the velocity of the gases passing through the turbine is proportional to the square root of the temperature of the gases. By using turbine blades which are substantially uncambered so that they can be loaded in either direction, a change in the temperature of the gases passing over the uncambered blades imposes a torque tending either to increase the speed of the turbine rotor or to decrease the speed. This torque reaction is solely a function of temperature when speed and pressure ratio are maintained constant. The torque reaction can be utilized in various ways. In this invention, it is used to regulate fuel flow to the power plant.

A feature of this invention is a device which accurately and reliably senses and controls the gas temperature of a combustion engine.

Another feature of the invention is a control system which regulates fuel flow to a combustion engine as a function of exhaust gas temperature.

Another feature of the invention is an exhaust turbo reactor having its speed and pressure ratio controlled so that a change in the temperature of the exhaust gases flowing through the turbo reactor will change the torque loading on the reactor, which torque change is used to regulate fuel flow to the combustion engine from which the exhaust gases are derived.

Still another feature of the invention is a fuel control system which provides instantaneous initiation of response to an off-temperature condition to an extent which is not achieved by temperature responsive devices due to a heat transfer lag nor by speed responsive devices due to rotor inertia.

Other features and advantages will be apparent from the specification and claims and from the accompanying drawing which illustrates an embodiment of the invention.

In the drawing:

The single figure shows a schematic arrangement of the invention as applied to a jet engine.

Referring to the drawing in detail, 10 indicates generally a jet engine having inlet 12, compressor 14, combustion chamber 16, turbine 18 and exhaust 20. Immediately upstream of turbine 18 there is provided an annular row of nozzle guide vanes 22. One or more bleeds 24 are located in the nozzle guide vane area so that a portion of the gases passing through the turbine may be bled from their normal path.

The bled or diverted gases pass through conduit 26 and conduit 28 and then through a turbo reactor, or control turbine, shown generally at 30 from which they are discharged through outlet 32. The turbo reactor is comprised of inlet 34, guide vanes 36 and bladed rotor 38. Throttle valve 40 is provided in conduit 28 immediately upstream of turbo reactor inlet 34, the throttle valve being connected by arm 42 and links 44 to pressure regulator 46 which maintains a constant pressure at the reactor inlet. The regulator is connected to reactor inlet 34 by line 48 and a variation in inlet pressure results in movement of throttle valve 40 in a direction to restore the desired pressure at the inlet. The regulator can be of any of the well known types for maintaining constant pressure, and in all probability would be an expansible bellows having its movable end connected to link 44 and having its interior vented to the reactor inlet. The regulator has not been illustrated in detail since such a device is so well known in the art.

A second pressure regulator 50, similar to regulator 46, is provided for maintaining a constant pressure at the reactor outlet. This regulator is connected to throttle valve 52 by links 54 and arm 56. A line 58 connects reactor outlet 32 to regulator 50 and any variation in outlet pressure results in movement of throttle valve 52 in a direction to restore the desired pressure at the outlet. Thus, throttle valves 40 and 52 and their respective regulators serve to maintain a constant pressure ratio across the turbo reactor.

Turbo reactor rotor 38 is connected by shaft 60 to synchronous motor 62 which is mounted on trunnion 64. The synchronous motor is controlled by means of a motor-generator set comprising variable speed motor 66, the speed of which is regulated by the operator through lever 68 and circuit 70, and variable frequency generator 72, drivingly connected by coupling 74 to motor 66. Generator 72 is wound in the same manner as synchronous motor 62 and the signal from the generator is fed to motor 62 through circuit 76.

Fuel for engine 10 is supplied through conduit 78, from a source not shown, to ring 80 from which it is distributed to the various nozzles within combustion chamber 16, one of the nozzles being shown at 82. Valve 84 in conduit 78 regulates fuel flow to the engine. This valve is connected by arm 86 to torque arm 88 on synchronous motor 62 so that any tendency of the motor to rotate on trunnion mounting 64 results in movement of the valve and regulation of fuel flow.

*Theory of operation*

Control of the speed and exhaust gas temperature of a gas turbine power plant is accomplished by regulating the flow of fuel to the power plant, there being a fixed relation between speed and temperature which relation is a function of fuel flow. In this invention the operator adjusts lever 68 to the desired speed and temperature, the adjustment determining the speed of motor 66. The speed of the motor in turn determines the speed of generator 72 as well as the signal fed to synchronous motor 62. The synchronous motor will tend to assume the same speed as generator 72 and, since turbo rotor 38 is connected to the synchronous motor, the rotor also will tend to assume that speed. Pressure regulators 46 and 50, in the meantime, are acting to maintain a constant pressure drop across the turbo reactor.

With the speed of the turbo rotor and the pressure drop across it maintained constant, the velocity of the exhaust gases passing over the uncambered blades 90 on turbo rotor 38 is proportional to the square root of the temperature of the gases. Accordingly, any change in the temperature of the exhaust gases will result in a change in the velocity of the gases, which velocity change will tend to alter the speed and the torque of the turbo rotor. However, since synchronous motor 62 tends to maintain the speed of turbo rotor 38 constant, a change in torque resulting from a temperature deviation will cause the synchronous motor to rotate about its trunnion mounting. Fuel valve 84 connected to the synchronous motor is positioned as a function of the torque reaction and fuel flow to engine 10 is regulated in accordance with the temperature of the exhaust gases.

It is to be understood that the invention is not limited to the specific embodiment herein illustrated and described, but may be used in other ways without departure from its spirit as defined by the following claims.

We claim:

1. A fuel control system for a combustion engine including a turbine subject to exhaust gases from the engine, means for maintaining a constant pressure ratio across the turbine, means for selecting and maintaining turbine speed, and means operatively connected to said turbine and responsive to changes in the temperature of the gases passing over the turbine for regulating fuel flow to the engine.

2. A fuel control system for a combustion engine including a turbine subject to exhaust gases from the engine, pressure responsive means for maintaining a constant pressure ratio across the turbine, means for maintaining turbine speed constant, and means operatively connected to said turbine and responsive to changes in the temperature of the gases passing over the turbine for regulating fuel flow to the engine.

3. A fuel control system for a combustion engine including a turbine subject to exhaust gases from the engine, means for maintaining turbine inlet pressure constant, means for maintaining turbine outlet pressure constant, means for maintaining turbine speed constant, and means operatively connected to said turbine, and responsive to changes in the temperature of the gases passing over the turbine for regulating fuel flow to the engine.

4. A fuel control system for a combustion engine including a turbine subject to exhaust gases from the engine, means for maintaining a constant pressure ratio across the turbine, means for maintaining turbine speed constant, means for imposing a torque loading on said turbine so that a change in the temperature of the gases passing over the turbine tends to increase or decrease turbine speed, and means operatively connected to the turbine and responsive to the tendency of the turbine to change speed for regulating fuel flow to the engine.

5. A fuel control system for a combustion engine including a bladed turbine subject to exhaust gases from the engine, means for maintaining a constant pressure ratio across the turbine, means for maintaining turbine speed constant, the blades on said turbine being substantially uncambered so that a change in the temperature of the gases passing over said turbine imposes a torque loading thereon tending to increase or decrease turbine speed, and means operatively connected to said turbine and responsive to the tendency of the turbine to change speed for regulating fuel flow to the engine.

6. A gas turbine power plant having fuel flow control means including a turbine subject to exhaust gases from the power plant, means for maintaining a constant pressure ratio across the turbine, a trunnion mounted synchronous motor connected to the turbine, means for establishing the speed of the synchronous motor, and means responsive to movement of the synchronous motor about its trunnion mounting caused by changes in the temperature of the gases passing over the turbine for regulating fuel flow to the power plant.

7. A gas turbine power plant having fuel flow control means including a turbine subject to exhaust gases from the power plant, means for maintaining a constant pressure ratio across the turbine, a trunnion mounted synchronous motor connected to the turbine, a motor-generator set for regulating the speed of the synchronous motor, and means responsive to movement of the synchronous motor about its trunnion mounting caused by changes in the temperature of the gases passing over the turbine for regulating fuel flow to the power plant.

8. A gas turbine power plant having fuel flow control means including a turbine, means for bleeding gases from the power plant and ducting said gases through said turbine, means for maintaining a constant pressure ratio across the turbine, a trunnion mounted synchronous motor connected to the turbine, means for establishing the speed of the synchronous motor, and means responsive to movement of the synchronous motor about its trunnion mounting caused by changes in the temperature of the gases passing through the turbine for regulating fuel flow to the power plant.

9. A gas turbine power plant having fuel flow control means including a turbine, means for bleeding gases from the power plant and ducting said gases through said turbine, means for maintaining turbine inlet pressure constant, means for maintaining turbine outlet pressure constant, a trunnion mounted synchronous motor connected to the turbine, means for establishing the speed of the synchronous motor, and means responsive to movement of the synchronous motor about its trunnion mounting caused by changes in the temperature of the gases passing through the turbine for regulating fuel flow to the power plant.

10. A gas turbine power plant having fuel flow control means including a turbine, means for bleeding gases from the power plant and ducting said gases through said turbine, means for maintaining a constant pressure ratio across the turbine, a trunnion mounted synchronous motor connected to the turbine, a motor-generator set for establishing the speed of the synchronous motor, and means responsive to movement of the synchronous motor about its trunnion mounting caused by changes in the temperature of the gases passing through the turbine for regulating fuel flow to the power plant.

11. A gas turbine power plant having fuel flow control means including a turbine subject to exhaust gases from the power plant, means for maintaining a constant pressure ratio across the turbine, a trunnion mounted synchronous motor connected to the turbine, a motor-generator set including a variable speed motor and a variable frequency generator for establishing the speed of the synchronous motor, means for regulating the speed of the variable speed motor, and means responsive to movement of the synchronous motor about its trunnion mounting caused by changes in the temperature of the gases passing over the turbine for regulating fuel flow to the power plant.

12. A gas turbine power plant having fuel flow control means including a turbine subject to exhaust gases from the power plant, means for maintaining a constant pressure ratio across the turbine, a trunnion mounted synchronous motor connected to the turbine, a motor-generator set including a variable speed motor and a variable frequency generator for establishing the speed of the synchronous motor, the synchronous motor and the variable frequency generator being wound in the same direction, means for regulating the speed of the variable speed motor, and means responsive to movement of the synchronous motor about its trunnion mounting caused by changes in the temperature of the gases passing over the turbine for regulating fuel flow to the power plant.

13. In a device of the class described for metering fuel flow to a combustion engine, a bladed turbine subject to gases from the engine, the turbine blades being uncambered, means for maintaining a constant pressure ratio across the turbine, a synchronous motor connected to the turbine, means for establishing the speed of the synchronous motor, and means associated with the synchronous motor for regulating fuel flow to the engine in response to changes in the temperature of the gases passing over the turbine.

14. In a device of the class described for metering fuel flow to a combustion engine, a bladed turbine subject to gases from the engine, the turbine blades being uncambered, means for maintaining a constant pressure ratio across the turbine, a trunnion mounted synchronous motor connected to the turbine, a motor-generator set for establishing the speed of the synchronous motor, a torque arm on the synchronous motor, and means connected with the torque arm for regulating fuel flow to the engine in response to movement of the synchronous motor about its trunnion mounting caused by changes in the temperature of the gases passing over the turbine.

15. In a device of the class described for metering fuel flow to a combustion engine, a bladed turbine subject to gases from the engine, means for maintaining a constant pressure ratio across the turbine, a trunnion mounted synchronous motor connected to the turbine, a motor-generator set for establishing the speed of the synchronous motor, a torque arm on the synchronous motor, and means connected with the torque arm for regulating fuel flow to the engine in response to movement of the synchronous motor about its trunnion mounting caused by changes in the temperature of the gases passing over the turbine.

16. In a device of the class described for metering fuel flow to a combustion engine, a bladed turbine subject to gases from the engine, the turbine blades being uncambered, means for maintaining a constant pressure ratio across the turbine, a trunnion mounted synchronous motor connected to the turbine, a motor-generator set for establishing the speed of the synchronous motor, the synchronous motor and the generator being mounted in the same direction, a torque arm on the synchronous motor, and means connected with the torque arm for regulating fuel flow to the engine in response to movement of the synchronous motor about its trunnion mounting caused by changes in the temperature of the gases passing over the turbine.

17. In a device of the class described for metering fuel flow to a combustion engine, a bladed turbine subject to gases from the engine, the turbine blades being uncambered, means for maintaining a constant pressure ratio across the turbine, a trunnion mounted synchronous motor connected to the turbine, a motor-generator set for establishing the speed of the synchronous motor, a torque arm on the synchronous motor, a valve for regulating fuel flow to the power plant, and a connection between the torque arm and the valve so that movement of the synchronous motor about its trunnion mounting caused by changes in the temperature of the gases passing over the turbine varies fuel flow to the engine.

18. For a gas turbine power plant comprising essentially a compressor section, a combustion section and a turbine section and having a turbine therein driven by the gases from the combustion chamber, a device for regulating fuel flow to the power plant including a control turbine having blades thereon, the blades being uncambered, means for ducting exhaust gases from the power plant across said turbine, means for maintaining a constant pressure ratio across the control turbine, a trunnion mounted synchronous motor connected to the control turbine, a motor-generator set including a variable speed motor and a variable frequency generator for establishing the speed of the synchronous motor, the synchronous motor and the variable frequency generator being wound in the same direction, a valve for regulating fuel flow to the power plant, the valve being operatively connected to the synchronous motor so that movement of the synchronous motor about its trunnion mounting caused by changes in the temperature of the gases passing over the turbine varies fuel flow to the power plant.

19. For a gas turbine power plant comprising essentially a compressor section, a combustion section and a turbine section and having a turbine therein driven by the gases from the combustion chamber, a device for regulating fuel flow to the power plant including a control turbine having blades thereon, the blades being uncambered, a bleed located between the combustion section and the turbine section, a conduit connecting the bleed and the control turbine for subjecting the control turbine to exhaust gases from the power plant, a first throttle valve located immediately upstream of the control turbine, means responsive to the pressure at the control turbine inlet for regulating the position of the first throttle valve, a second throttle valve immediately downstream of the control turbine, means responsive to the control turbine discharge pressure for regulating the position of the second throttle valve, the first and second throttle valve regulating means maintaining a constant pressure ratio across the control turbine, a trunnion mounted synchronous motor connected to the control turbine, a variable speed motor, means for regulating the variable speed motor, a variable frequency generator connected to and driven by the variable speed motor, an electrical connection between the variable speed generator and the synchronous motor, a valve for regulating fuel flow to the power plant, a torque arm on the synchronous motor, and a connection between the valve and the arm so that rotational movement of the synchronous motor about its trunnion mounting caused by changes in the temperature of the gases passing over the turbine varies the position of the fuel valve.

References Cited in the file of this patent

UNITED STATES PATENTS

| | | |
|---|---|---|
| 2,291,653 | Samiran | Aug. 4, 1942 |
| 2,297,918 | Schorn | Oct. 6, 1942 |
| 2,303,998 | Holley | Dec. 1, 1942 |
| 2,336,232 | Doran | Dec. 7, 1943 |
| 2,358,815 | Lysholm | Sept. 26, 1944 |
| 2,378,036 | Reggio | June 12, 1945 |
| 2,422,808 | Stokes | June 24, 1947 |
| 2,530,139 | Weigand | Nov. 14, 1950 |
| 2,612,020 | Griffith | Sept. 30, 1052 |